(12) United States Patent
Hazan (10) Patent No.: US 9,056,394 B2
(45) Date of Patent: Jun. 16, 2015

(54) METHODS AND SYSTEMS FOR DETERMINING EFFICIENT ROBOT-BASE POSITION

(71) Applicant: Siemens Product Lifecycle Management Software Inc., Plano, TX (US)

(72) Inventor: Moshe Hazan, Elad (IL)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 300 days.

(21) Appl. No.: 13/629,390

(22) Filed: Sep. 27, 2012

(65) Prior Publication Data
US 2014/0088763 A1     Mar. 27, 2014

(51) Int. Cl.
    *G05B 19/04*     (2006.01)
    *B25J 9/16*     (2006.01)
(52) U.S. Cl.
    CPC ..... *B25J 9/1666* (2013.01); *G05B 2219/40438* (2013.01)
(58) Field of Classification Search
    CPC ............... B25J 9/1666; G05B 2219/40438
    USPC ................................................ 700/255
    See application file for complete search history.

(56) References Cited

U.S. PATENT DOCUMENTS

| | | | |
|---|---|---|---|
| 6,216,058 | B1 | 4/2001 | Hosek et al. |
| 6,493,607 | B1 | 12/2002 | Bourne et al. |
| 2008/0306628 | A1 | 12/2008 | Ng-Thow-Hing et al. |

FOREIGN PATENT DOCUMENTS

EP     1090723 A2     4/2001

OTHER PUBLICATIONS

Y. Hwang et al., "Optimizing Robot Placement for Visit-Point Tasks", Artificial Intelligence and Manufacturing: A Research Planning Workshop, Albuquerque, NM, US, Jun. 1996. 7 pages.
P. Chen et al., "SANDROS: A Motion Planner with Performance Proportional to Task Difficulty", Proceedings of the International Conference on Robotics and Automation, Nice, May 1992. 8 pages.
Faverjon et al., "The Mixed Approach for Motion Planning: Learning Global Strategies from a Local Planner", Proceedings of the International Joint Conference on Artificial Intelligence, Jan. 1, 1987. 7 pages.
Gueta et al., "Compact Design of Work Cell with Robot Arm and Positioning Table Under a Task Completion Time Constraint", Intelligent Robots and Systems, IROS 2009. 7 pages.

(Continued)

*Primary Examiner* — Khoi Tran
*Assistant Examiner* — Adam Mott (57) ABSTRACT

Various disclosed embodiments include systems and methods for determining an efficient robot-base position. The method includes receiving available robot-base positions and determining valid robot-base positions from the available robot-base positions. The method includes generating for the valid robot-base positions respective directed graphs providing a plurality of robotic-paths. The method includes determining the shortest robotic-path between start and end nodes. The method includes determining and storing the efficient robot-base position from the valid robot-base positions, wherein the efficient robot-base position has the shortest, collision-free robotic-path between start and end nodes.

20 Claims, 8 Drawing Sheets

(56) References Cited

OTHER PUBLICATIONS

Gueta et al., Practical Point-to-Point Multiple-Goal Task Realization in a Robot Arm with a Rotating Table:, Advanced Robotics, VSP, Zeist, NL, vol. 25, No. 6-7. 22 pages.

PCT Search Report for PCT Application No. PCT/US2013/061340 mailed Jan. 31, 2014. 16 pages.

Sanchez, G. et al. "Locally-Optimal Path Planning by Using Probabilistic RoadMaps and Simulated Annealing". Proceedings of IASTED International Conference on Robotics and Applications. (Oct. 1999) (6 pages).

Ahuactzin, J.M. et al., "Using genetic algorithms for robot motion planning," in Proc. of 10th European Conference on Artificial Intelligence, 5 pages (1992).

Pack, D., Toussant, G., Haupt, R., "Robot trajectory planning using a genetic algorithm", SPIE, 2824, 171-182. (1996).

Tian, L. et al., "An effective robot trajectory planning method using a genetic algorithm", Mechatronics, 14, pp. 455-470. (2004).

Yue, S.G. et al., "Point-to-point trajectory planning of flexible redundant robot manipulators using genetic algorithms", To appear in Robotica. (2001) pp. 1-24.

Hein et al, "Automated Generated Collision-Free Time Robot Movements in Industrial Environments Based on Rounding", International Symposium on Assembly and Task Planning, pp. 110-115, May 2001.

Bohlin and Kavraki, "Path Planning Using Lazy PRM", Proceedings of the 2000 IEEE International Conference on Robotics & Automation, pp. 521-528, Apr. 2000.

METHODS AND SYSTEMS FOR DETERMINING EFFICIENT ROBOT-BASE POSITION

CROSS-REFERENCE TO OTHER APPLICATIONS

This application contains subject matter that is common with, but otherwise unrelated to, commonly\-assigned U.S. Patent Application Publication No. US 2011/0153080, application Ser. No. 12/971,020, entitled "METHOD AND APPARATUS FOR INDUSTRIAL ROBOTIC PATHS CYCLE TIME OPTIMIZATION USING FLY BY", filed Dec. 17, 2010 which is hereby incorporated herein by reference.

TECHNICAL FIELD

The present disclosure is directed, in general, to automated industrial operations and robotics, and in particular to methods and systems for determining an efficient robot-base position.

BACKGROUND OF THE DISCLOSURE

Industrial robots are widely used for processes such as spot and arc welding, object handling, and assembly. One of the challenges of robot programmers is the determination of an efficient position of a robot-base.

SUMMARY OF THE DISCLOSURE

Various disclosed embodiments include methods and systems for determining an efficient robot-base position. According to disclosed embodiments, the method includes receiving an ordered set of locations defining orders, positions, and orientations of a robot's end of arm. The method includes determining available robot-base positions and determining valid robot-base positions from the available robot-base positions, wherein the robot's end of arm can access the ordered set of locations from the valid robot-base positions.

The method includes determining robot joint configurations corresponding to the valid robot-base positions, wherein the robot joint configurations define the positions of robot joints for the ordered set of locations. The method includes generating for the valid robot-base positions respective directed graphs providing a plurality of robotic-paths, wherein the robotic-paths comprise a plurality of nodes including a start and an end node arranged based on the ordered locations and a plurality of directional connectors having respective weight factors connecting the nodes, wherein the nodes represent the robot-joint configurations at the ordered locations and the weight factors represent the effort required by the robot joints to rotate.

The method includes determining the shortest robotic-path between the start and the end nodes, wherein the shortest robotic-path is based on the weight factors of the directional connectors. The method includes determining and storing the efficient robot-base position from the valid robot-base positions, wherein the efficient robot-base position has the shortest robotic-path between the start and the end nodes.

According to embodiments, a system for determining an efficient robot-base position includes at least one processor and a memory connected to the processor. The system is configured to receive an ordered set of locations defining orders, positions, and orientations of a robot's end of arm. The system is configured to determine available robot-base positions and to determine valid robot-base positions from the available robot-base positions, wherein the robot's end of arm may access the ordered set of locations from the valid robot-base positions. The system is configured to determine robot joint configurations corresponding to the valid robot-base positions, wherein the robot joint configurations define the positions of robot joints for the ordered set of locations. The system is configured to generate for the valid robot-base positions respective directed graphs providing a plurality of robotic-paths, wherein the robotic-paths comprise a plurality of nodes including a start and an end node arranged based on the ordered locations and a plurality of directional connectors having respective weight factors connecting the nodes, wherein the nodes represent the robot joint configurations at the ordered locations and the weight factors represent the effort required by the robot joints to rotate.

The system is configured to determine the shortest robotic-path between the start and the end nodes, wherein the shortest robotic-path is based on the weight factors of the directional connectors. The system is configured to determine the efficient robot-base position from the valid robot-base positions, wherein the efficient robot-base position has the shortest robotic-path between the start and the end nodes.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will recognize that the principles of the present disclosure may be implemented in any suitably arranged device or a system. The numerous innovative teachings of the present disclosure will be described with reference to exemplary non-limiting embodiments.

Industrial robots are used for spot welding, arc welding, object handling, assembly and other industrial processes. It is desirable to place the base of a robot (referred to as "robot-base") at an efficient position from which a robot may access a target and perform predetermined tasks. Specifically, from the efficient position a robot's end of arm can move along a robotic-path with minimal change in robot joint values to perform the predetermined tasks. The robotic-path may be defined by a list of points or "locations" defining the position and orientation of the robot's end of arm. Also, from the efficient position, the robot's end of arm can move along the robotic-path without any collision.

Various disclosed embodiments provide methods and systems for determining an efficient robot-base position. According to embodiments, the efficient robot-base position is selected from a plurality of available robot-base positions. The efficient robot-base position provides the shortest robotic-path from an initial configuration to a final configuration and provides collision-free access to a target to perform predetermined tasks.

Figure 1:
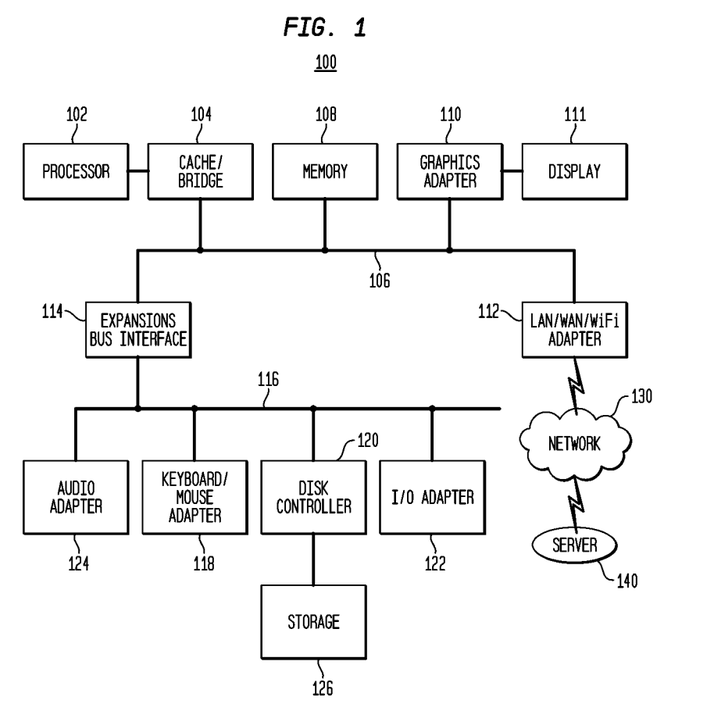
FIG. 1 illustrates a system according to disclosed embodiments.

FIG. 1 depicts a block diagram of system 100 in which an embodiment can be implemented by software or otherwise to perform the processes as described herein, and in particular as each one of a plurality of interconnected and communicating systems as described herein. The system depicted includes processor 102 connected to level two cache/bridge 104, which is connected in turn to local system bus 106. Local system bus 106 may be, for example, a peripheral component interconnect (PCI) architecture bus. Also connected to local system bus in the depicted example are main memory 108 and graphics adapter 110. Graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

System 100 in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to network 130 (not a part of system 100), which can be any public or private data processing system network or combination of networks, as known to those of skill in the art, including the Internet. System 100 can communicate over network 130 with server system 140, which is also not part of system 100, but can be implemented, for example, as a system 100. System 100 may be configured as a workstation, and a plurality of similar workstations may be linked via a communication network to form a distributed system in accordance with embodiments of the disclosure.

Figure 2:
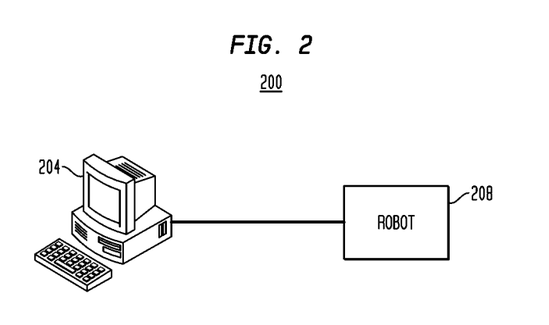
FIG. 2 illustrates a system according to disclosed embodiments.

FIG. 2 illustrates system 200 according to disclosed embodiments. System 200 comprises computer workstation 204 which may be used to determine an efficient robot-base position for robot 208. Also, system 200 may be used to program robot 208 to move to the efficient robot-base position to access a target to perform predetermined tasks such as, for example, spot welding.

Figure 3:
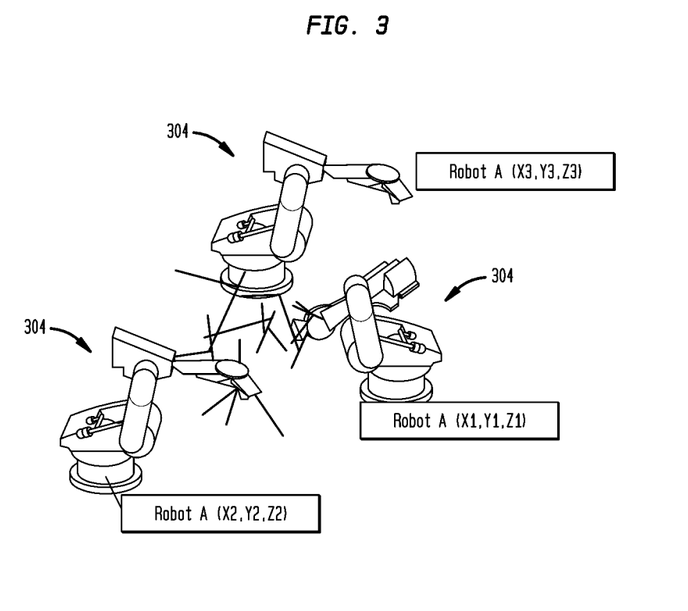
FIG. 3 illustrates different robot-base positions for predetermined tasks.

FIG. 3 illustrates an exemplary robot 304 which performs predetermined tasks from three different robot base positions: (X1, Y1, Z1), (X2, Y2, Z2), and (X3, Y3, Z3).

Figure 4A:
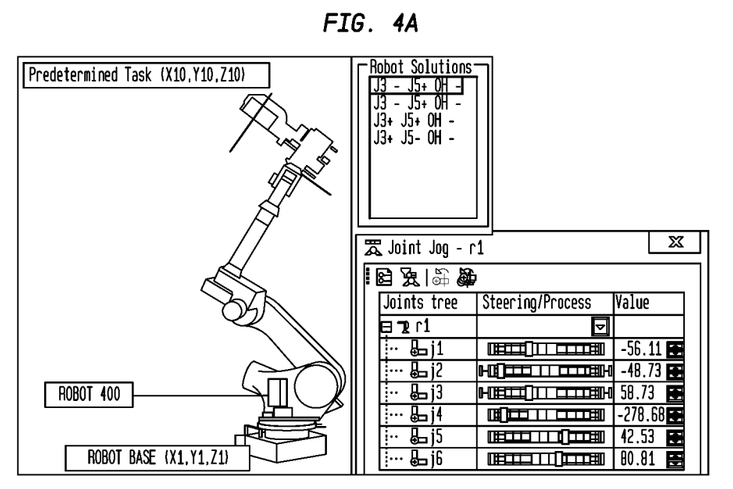
FIGS. 4A and 4B illustrate a robot with different configurations.
Figure 4B:
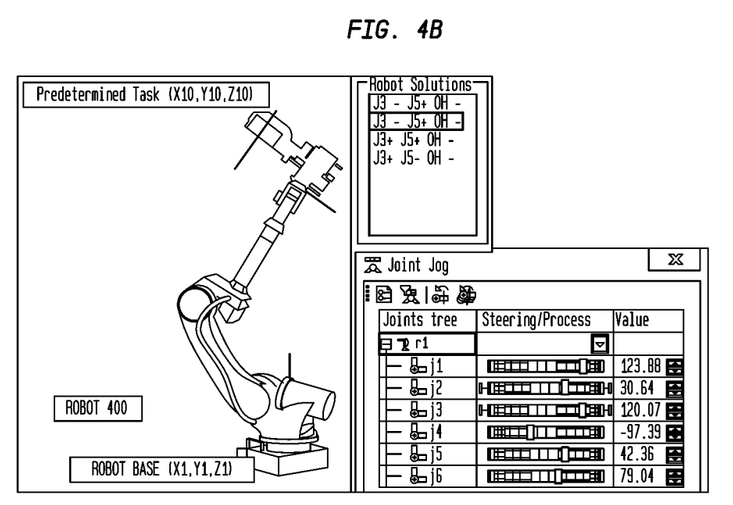

FIGS. 4A and 4B illustrate robot 400 which is located at a robot-base position (X1, Y1, Z1) but can perform a predetermined task at (X10, Y10, Z10) with different configurations: "J3−J5+OH—", "J3−J5−OH—", "J3+J5+OH—", "J3+J5−OH—". As shown in FIG. 4A, robot 400 may utilize configuration "J3−J5+OH—" to perform the predetermined task at (X10, Y10, Z10). Also, as shown in FIG. 4B, robot 400 may utilize configuration "J3−J5−OH—" to perform the predetermined task at (X10, Y10, Z10). Each configuration requires different robot joint values (e.g., J1 changes from 123.98 to →−56.11; J2 changes from 30.64 to −48.73). It will be appreciated that a robot configuration defines the location or position of the robot joints.

According to disclosed embodiments, system 200 receives a robotic path which provides a list of points or "locations" defining the position and orientation of a robot's end of arm. As discussed before, the robot's end of arm accesses the "locations" to perform predetermined tasks. System 200 also receives available robot-base positions. The available robot-base position is defined as the positions on which the base of the robot may be placed. According to disclosed embodiments, the robot-base position may be represented by coordinates (X, Y, Z).

System 200 may optionally receive effort factors of robot-joints. The effort factor indicates a relative effort required by a robot joint to rotate by, for example, one degree. Table I below lists example effort factors of robot-joints.

TABLE I

| Joint | Effort Factor |
|---|---|
| J1 | 2 |
| J2 | 2 |
| J3 | 2 |
| J4 | 1 |
| J5 | 1 |
| J6 | 1 |

It will be appreciated from Table I that the joint J1 is slower than the joint J4 because joint J1 requires twice the effort to rotate by one degree than the effort required by the joint J4. System 200 then determines valid robot-base positions from the available robot-base positions. A valid robot-base position is defined as a robot-base position from which the end of arm may reach a target to perform predetermined tasks without causing a collision. According to embodiments, an available robot-base position is evaluated to determine whether all locations on the robotic-path provide access to the targets. If any location on the robotic-path fails to provide access to the target, the corresponding available robot-base position is not considered a valid robot-base position.

Figure 5A:
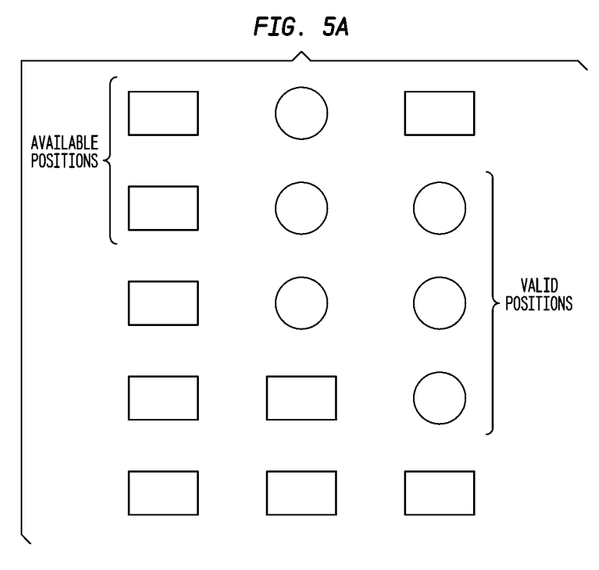
FIG. 5A illustrates available robot-base positions and valid robot-base positions.

FIG. 5A illustrates available robot-base positions and valid robot-base positions.

The available robot base positions are indicated by rectangles while the valid robot-base positions are indicated by circles.

Figure 5B:
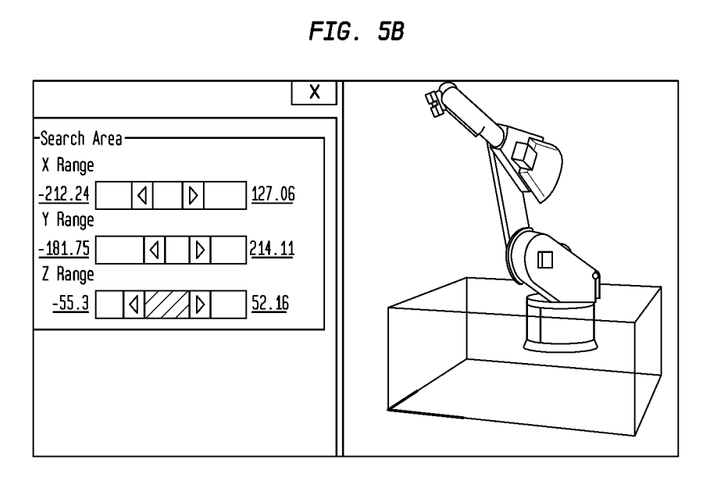
FIG. 5B illustrates ranges defining a volume.

According to embodiments, system 200 may receive a volume defined by an X range (start→end), a Y range (start→end), and a Z range (start→end), which define the range of the available robot-base positions as shown in FIG. 5B.

According to embodiments, system 200 may utilize a rough step and a fine step to define the available robot base positions. System 200 uses the rough step in three-dimensional ranges and creates a list of available robot-base positions. Next, system 200 determines the valid positions from the available positions. The valid positions are defined as those positions which the robot may access without a collision. For each valid robot-base position (Xi, Yi, Zi) determined using the rough steps, other valid robot-base positions are determined by the fine steps. According to disclosed embodiments, a search area range for a valid-robot base position may be defined as follows:

X is between {Xi−rough step+fine step} and {Xi+ rough step−fine step}

Y is between {Yi−rough step+fine step} and {Yi+ rough step−fine step}

Z is between {Zi−rough step+fine step} and {Zi+ rough step−fine step}

According to disclosed embodiments, the foregoing ranges are used to determine available robot-base positions, and the valid robot-base positions are determined. As discussed before, the valid robot-base positions can be reached without any collision.

System 200 then determines robot joint configurations corresponding to the valid robot-base positions. The robot joint configurations define the configurations of robot-joints for the ordered set of locations. According to embodiments, the robot joint configurations are determined based on whether the robot's end of arm may have access to a target from the locations or listed points on the robotic-path. It will be appreciated that for each location, there may be more than one set of configurations that provide access to the target. According to some embodiments, the movement between any two configurations of the robot may be represented by a numerical value.

According to disclosed embodiments, system 200 generates directed graphs for the respective valid robot-base positions. The directed graph provides a plurality of robotic-paths with a plurality of nodes including a start and an end node and a plurality of directional connectors connecting the nodes. The nodes are arranged based on the ordered locations and the directional connectors have respective weight factors. According to embodiments, the nodes represent the robot joint configurations at the ordered locations and the weight factors represent the effort required by the robot-joints to move from a source to a target. According to some embodiments, the weight factor of the directional connector leading to the end node may be assigned a zero value. According to some embodiments, directional connectors are positioned between two nodes at successive locations (e.g., node at location N and node at location N+1). According to other embodiments wherein motion-types between locations are pre-defined, while robot joint configurations may not change, joint values within a configuration may be changed. In such an instance, directional connectors are placed between two successive nodes with same configurations.

Figure 6:
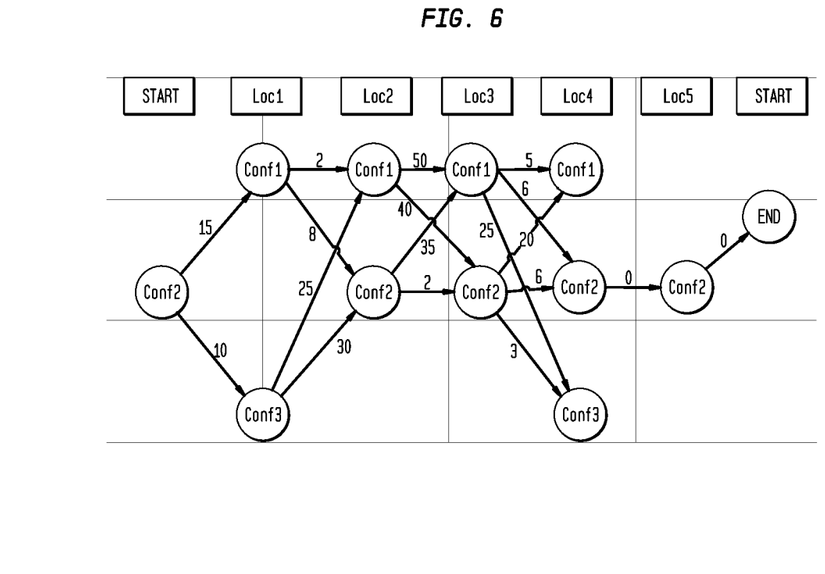
FIG. 6 illustrates a directed graph according to disclosed embodiments.

FIG. 6 illustrates a directed graph for a valid robot-base position according to disclosed embodiments. The directed graph provides one or more nodes arranged by the locations. The nodes represent configurations of the robot-joints, and the nodes of successive locations are joined by the directional connectors having respective weight factors. According to embodiments, system 200 determines the shortest route between the start and end nodes for the valid robot-base positions using the directed graph. The shortest robotic-path is determined based on the weight-factors of the directional connectors that connect the nodes. It will be understood by those skilled in the art that one of several known algorithms may be used to determine the shortest route.

According to embodiments, system 200 determines the efficient robot-base position from the valid robot-base positions, wherein the efficient robot-base position has the shortest path between start and end nodes. According to some embodiments, the efficient robot-base position may be determined from robot joint movements on the robotic-path. The robot joint movement may be determined from the equation below:

$$\Sigma(|\text{Joint\#I\_value\_in\_node}\ k - \text{Joint\#I\_value\_in\_node\_j}| * \text{effort factor of Joint\#I})$$

In the foregoing equation, the weight factor of a directional connector from node "k" forward to node "I" is represented by the sum the movement of a joint multiplied by its joint efforts.

The shortest robotic-path is provided by valid robot-base position which has the minimal accumulation of weight factor from the start node to the end node. System 200 determines if the robotic-path is collision-free by using, for example, a Realistic Robot Simulation (RRS) application. It will be understood by those skilled in the art that RRS communicates with a Realistic Controller Simulation (RCS) module which enables simulations in virtual systems utilizing robot controller-specific motion behavior.

If the robotic-path is collision free, the process ends. Otherwise, system 200 determines the next shortest robotic-path and performs the above-described analysis. According to other embodiments, additional locations may be added to avoid any collision, and such a method is described in commonly-assigned U.S. patent application Ser. No. 12/971,020, entitled "METHOD AND APPARATUS FOR INDUSTRIAL ROBOTIC PATHS CYCLE TIME OPTIMIZATION USING FLY BY", filed Dec. 17, 2010, Published as US2011/0153080, which is incorporated herein in its entirety for all purposes. If additional locations are added, the weight factor is updated to include the movement between the new locations, and then the shortest robotic-path is determined.

Figure 7:
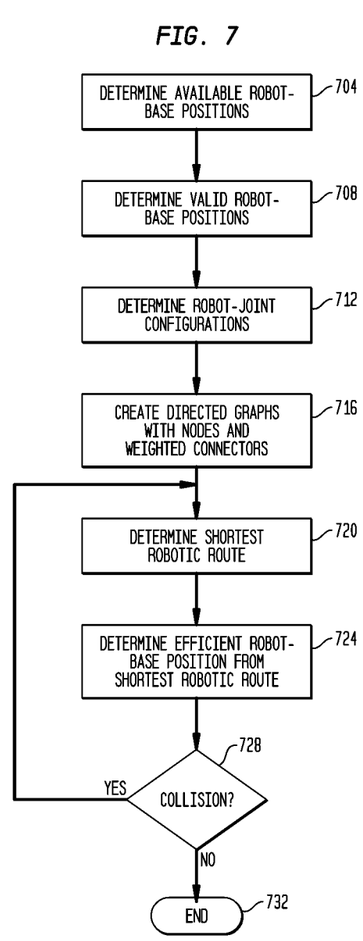
FIG. 7 is a flowchart of a process according to disclosed embodiments.

FIG. 7 is a flowchart of a process according to disclosed embodiments. Such a process can be performed, for example, by system 200 as described above, but the "system" in the process below can be any apparatus configured to perform a process as described. In block 704, system 200 determines available robot-base positions. According to some embodiments, system 200 may initially receive the available robot-base positions from a database or such information may be initially provided by a user.

In block 708, system 200 determines valid robot-base positions from available robot-base positions. As discussed before, the robot's end of arm may access an ordered set of locations from the valid robot-base positions.

In block 712, system 200 determines robot-joint configurations corresponding to the valid robot-base positions. The robot joint configurations define the positions of robot joints for the ordered set of locations.

In block 716, system generates for each valid robot-base positions respective directed graphs providing a plurality of robotic-paths. The robotic-paths comprise a plurality of nodes including a start and an end node arranged based on the ordered locations and a plurality of directional connectors having respective weight factors connecting the nodes. The nodes represent the robot joint configurations at the ordered locations and the weight factors represent the effort required by the robot joints to move from a source node forward to a target node.

In block 720, system 200 determines for each valid robot base position the shortest path between the start and the end nodes. The shortest robotic-path is based on the weight factors of the directional connectors and is collision-free.

In block 724, system 200 determines the efficient robot-base position from the valid robot-base positions and stores the efficient robot-base position. The efficient robot-base position has the shortest robotic route between the start and the end nodes. In block 728, system 200 determines if there are any collisions. If there are any collisions, system returns to block 720. Otherwise, the flow ends at block 732.

According to embodiments, a non-transitory computer-readable medium is encoded with computer-executable instructions for determining an efficient robot-base position. The computer-executable instructions when executed cause at least one system to receive an ordered set of locations defining an order, position, and orientation of the robot's end of arm. The computer-executable instructions when executed cause at least one system to determine available robot-base positions and determine valid robot-base positions from the available robot-base positions, wherein the robot's end of arm may access the ordered set of locations from the valid robot-base positions.

The computer-executable instructions when executed cause at least one system to determine robot joint configurations corresponding to the valid robot-base positions. The robot joint configurations define the positions of robot joints for the ordered set of locations. The computer-executable instructions when executed cause at least one system to generate for the valid robot-base positions respective directed graphs providing a plurality of robotic-paths, wherein the robotic-paths comprise a plurality of nodes including a start and an end node arranged based on the ordered locations and a plurality of directional connectors having respective weight factors connecting the nodes, wherein the nodes represent the robot joint configurations at the ordered locations and the weight factors represent the effort required by the robot joints to travel between two nodes. The computer-executable instructions when executed cause at least one system to determine the shortest robotic-path between the start and the end nodes, wherein the shortest robotic-path is based on the weight factors of the directional connectors.

The computer-executable instructions when executed cause at least one system to determine the efficient robot-base position from the valid robot-base positions, wherein the efficient robot-base position has the shortest robotic-path between the start and the end nodes.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for determining an efficient robot-base position by a data processing system, comprising:
   receiving an ordered set of locations defining order, position and orientation for an end of arm of a robot;
   determining available robot-base positions;
   determining valid robot-base positions from the available robot-base positions, wherein the end of arm can access the ordered set of locations from the valid robot-base positions without collision;
   determining robot-joint configurations corresponding to the valid robot-base positions, wherein the robot-joint configurations define positions of robot-joints for the ordered set of locations;
   generating for the valid robot-base positions respective directed graphs providing a plurality of robotic-paths, wherein the robotic-paths comprise a plurality of nodes including a start and an end node arranged based on the order for the ordered set of locations and a plurality of directional connectors having respective weight factors connecting the nodes, wherein the nodes represent the robot-joint configurations at the ordered set of locations and the weight factors represent an effort required by the robot-joints to rotate;
   determining a shortest robotic-path between the start and the end nodes, wherein the shortest robotic-path is based on the weight factors of the directional connectors; and
   determining and storing the efficient robot-base position from the valid robot-base positions by the data processing system, wherein the efficient robot-base position has the shortest robotic-path between the start and the end nodes.

2. The method of claim 1, wherein the available robot-base positions are determined by a rough step and a fine step.

3. The method of claim 1, wherein each of the robot-joint configurations are determined from robot joint values of the robot-joints which define the position of the robot-joints.

4. The method of claim 1, wherein the weight factor is determined from the distance between two positions of robot joints and a corresponding joint-factor.

5. The method of claim 1, wherein a zero value is assigned to the weight factor of the directional connector leading to the end node.

6. The method of claim 4, wherein the corresponding joint factor indicates a relative effort required for a robot-joint to rotate.

7. The method of claim 6, wherein the joint-factor is the relative effort for a robot to rotate one degree about a robot-joint.

8. A non-transitory computer-readable medium encoded with computer-executable instructions for determining an efficient robot-base position, wherein the computer-executable instructions when executed cause at least one system to:
   receive an ordered set of locations defining order, position and orientation for an end of arm of a robot;
   determine available robot-base positions;
   determine valid robot-base positions from the available robot-base positions, wherein the end of arm may access the ordered set of locations from the valid robot-base positions;
   determine robot-joint configurations corresponding to the valid robot-base positions, wherein the robot-joint configurations define positions of robot-joints for the ordered set of locations;
   generate for the valid robot-base positions respective directed graphs providing a plurality of robotic-paths, wherein the robotic-paths comprise a plurality of nodes including a start and an end node arranged based on the order for the ordered set of locations and a plurality of directional connectors having respective weight factors connecting the nodes, wherein the nodes represent the robot-joint configurations at the ordered set of locations and the weight factors represent an effort required by the robot-joints to rotate;
   determine a shortest robotic-path between the start and the end nodes, wherein the shortest robotic-path is based on the weight factors of the directional connectors; and
   determine and store the efficient robot-base position from the valid robot-base positions, wherein the efficient robot-base position has the shortest robotic-path between the start and the end nodes.

9. The non-transitory computer-readable medium of claim 8, wherein the available robot-base positions are determined by a rough step and a fine step.

10. The non-transitory computer-readable medium of claim 8, wherein each of the robot-joint configurations are determined from robot joint values of the robot-joints which define the positions of the robot-joints.

11. The non-transitory computer-readable medium of claim 8, wherein the weight factor is determined from the distance between two positions of robot-joints and a corresponding joint-factor.

12. The non-transitory computer-readable medium of claim 11, wherein the corresponding joint factor indicates a relative effort required for a robot-joint to rotate.

13. The non-transitory computer-readable medium of claim 12, wherein the joint-factor is the relative effort for a robot to rotate one degree about a robot-joint.

14. The non-transitory computer-readable medium of claim 8, wherein a zero value is assigned to the weight factor of the directional connector leading to the end node.

15. A system for determining an efficient robot-base position, comprising:
   at least one processor;
   a memory connected to the processor, wherein the system is configured to:
   receive an ordered set of locations defining order, position and orientation for an end of arm of a robot;
   determine available robot-base positions;
   determine valid robot-base positions from the available robot-base positions, wherein the end of arm may access the ordered set of locations from the valid robot-base positions;

determine robot-joint configurations corresponding to the valid robot-base positions, wherein the robot joint configurations define positions of robot joints of for the ordered set of locations;

generate for the valid robot-base positions respective directed graphs providing a plurality of robotic-paths, wherein the robotic-paths comprise a plurality of nodes including a start and an end node arranged based on the order for the ordered set of locations and a plurality of directional connectors having respective weight factors connecting the nodes, wherein the nodes represent the robot-joint configurations at the ordered set of locations and the weight factors represent an effort required by the robot-joints to rotate;

determine a shortest robotic-path between the start and the end nodes, wherein the shortest robotic-path is based on the weight factors of the directional connectors; and determine and store the efficient robot-base position from the valid robot-base positions by the processor, wherein the efficient robot-base position has the shortest robotic-path between the start and the end nodes.

16. The system of claim 15, wherein the available robot-base positions are determined by a rough step and a fine step.

17. The system of claim 15, wherein each of the robot-joint configurations are determined from robot joint values of the robot-joints which provide access to the ordered locations.

18. The system of claim 15, wherein the weight factor is determined from the distance between two positions of robot-joints and a corresponding joint-factor.

19. The system of claim 18, wherein the corresponding joint factor indicates a relative effort required for a robot-joint to rotate.

20. The system of claim 15, wherein a zero value is assigned to the weight factor of the directional connector leading to the end node.

* * * * *